Patented May 24, 1938

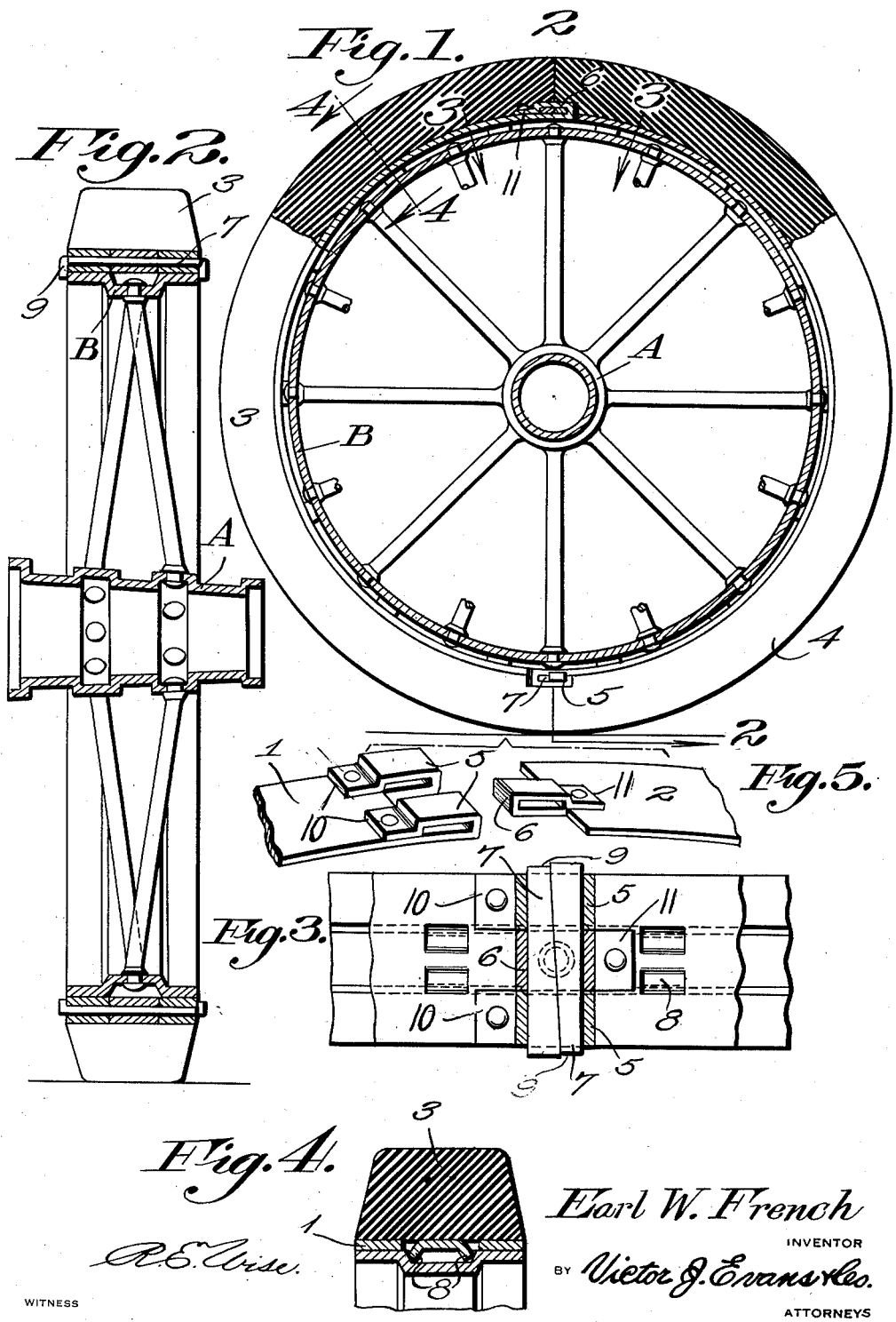

2,118,702

UNITED STATES PATENT OFFICE 2,118,702

VEHICLE WHEEL

Earl W. French, Haines, Territory of Alaska

Application February 8, 1937, Serial No. 124,741

1 Claim. (Cl. 152—306)

This invention relates to vehicle wheels, and its general object is to provide a rubber tire attaching device that is primarily designed for use with the wheels of farm wagons and the like, to make them more suitable for use as tractor or truck trailers, so as to facilitate travelling and hauling thereof over hard roads and highways.

Another object is to provide a rubber tire attaching device for the purpose set forth, that can be applied and removed with respect to the wheel in an easy and expeditious manner, with only the use of a hammer or other driving tool and when applied, casual removal or displacement is practically impossible.

Another object is to provide a rubber tire attaching device for drop center or grooved wheels now in general use on farm wagons, and which can be applied thereto, without making any change in the wheel structure.

A still further object of the invention is to provide a rubber tire attaching device that is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a side view illustrating the application of my device to a farm wagon wheel and with parts in section.

Figure 2 is a sectional view taken approximately on line 2—2 of Figure 1.

Figure 3 is a sectional view taken approximately on line 3—3 of Figure 1, looking in the direction of the arrows.

Figure 4 is a sectional view taken approximately on line 4—4 of Figure 1, looking in the direction of the arrows.

Figure 5 is a fragmentary perspective view illustrating the wedge receiving means for securing the sections of the tire carrying band together and in fixed association with a wheel.

Referring to the drawing in detail, the letter A indicates a wheel of the type now generally employed on farm wagons and the like, and which includes a drop center rim B, or a rim having a centrally disposed groove therein, as best shown in Figure 2 of the drawing.

My device is preferably applied to wheels of the above mentioned type, and includes a band formed from a pair of semi-circular band sections 1 and 2 which are identical in construction, and have tire sections 3 and 4 welded or otherwise secured thereto, the tire sections being co-extensive with the length of the band sections, as will be apparent upon inspection of Figure 1, so that when the band sections having the tire sections secured thereto are fixed about the rim, the tire sections are disposed in end to end abutting relation.

In order to secure the band sections together about the rim of the wheel, I employ wedge receiving socket members or keepers, and one end of each section has a pair of spaced keepers 5 thereon while its opposite end has a single keeper 6 that is centrally disposed with respect to its end. It will be obvious from Figure 5 that when applying the sections to a wheel, that the keepers 6 are received between the keepers 5, for disposing the sockets thereof in registration with each other, to receive a pair of flat tapered wedge members 7 which have their outer longitudinal faces straight to fit the corresponding faces of the keepers and their inner longitudinal faces inclined to provide the taper and for disposal in contacting engagement with each other, as best shown in Figure 3, in order to set up a wedging action for drawing the ends of the band sections together and of course into binding engagement with the rim of the wheel.

The wedge receiving keepers are preferably integral with the ends of the band sections, and the keepers 5 are formed by recessing an end of the section with the recess extending centrally into said end to provide strips. The strips or portions of the material upon opposite sides of the recess are bent rearwardly upon themselves and spaced from the section, thence the strips or portions are bent to provide ears 10 which are riveted or otherwise secured to the section. The wedge receiving keeper 6 is formed by cutting the band section upon opposite sides to leave a strip centrally extending therefrom, and the strip is likewise bent rearwardly upon itself and to provide an ear 11 riveted or otherwise secured to the section, with the result, it will be seen that the strips provide the wedge receiving socket members or keepers that are substantially rectangular in cross section as clearly shown in Figure 5.

The band sections are also provided with inwardly directed lugs 8 struck therefrom and which are arranged in pairs, and these lugs are disposed at equi-distantly spaced intervals about the sections, to be received in the groove of the rim, as best shown in Figure 4, so as to prevent lateral movement of the device with respect to the wheel.

From the foregoing description and disclosure of the drawing, it will be obvious that I have provided a rubber tire attaching device that includes a pair of cooperating sections of semi-circular formation, which can be applied to the rim of the wheel in an easy and expeditious manner, and merely by the use of a hammer, or other driving tool, in that all that is necessary to do, while applying the device, is to insert the wedge members in the sockets of the keepers, and drive the same in wedging association, thence the small ends of the wedge members are bent at right angles to the remaining portions thereof, to provide heads 9 which prevent accidental removal of the wedge members, as will be apparent.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A rubber tire attaching device for a vehicle wheel having a centrally disposed circumferentially arranged groove in the rim thereof, said device comprising a pair of semi-circular band sections, tire sections fixed to the band sections, socketed keepers on the ends of the band sections and arranged for cooperative association for disposing the sockets thereof in registration, said sockets being substantially rectangular in cross section, a pair of wedges received in the sockets of cooperating keepers for securing the band sections to the rim and having straight outer faces for fitting the corresponding walls of the keepers and inclined engaging inner faces to set up a wedging action, said wedges having their small ends bent at right angles thereto to provide heads thereon to prevent removal thereof from the keepers, and lugs struck from and extending inwardly from the band sections and received in the groove to prevent lateral movement of the band sections with respect to the rim.

EARL W. FRENCH.